United States Patent
Knutson

[11] Patent Number: 5,623,751
[45] Date of Patent: Apr. 29, 1997

[54] RETRACTABLE BINDER FOR SECURING CARGO LOADS

[76] Inventor: Kenneth Knutson, Rte. 2, Box 67, Toronto, S. Dak. 57268

[21] Appl. No.: 491,523

[22] Filed: Jun. 16, 1995

[51] Int. Cl.⁶ .................. A44B 21/00; B66F 3/00
[52] U.S. Cl. .................. 24/71.1; 24/68 CD; 254/231
[58] Field of Search .................. 24/68 CD, 68 CT, 24/71.1, 300–302, 298, 70 CT, 68 R; 248/497; 254/231; 403/43–45, 47

[56] References Cited

U.S. PATENT DOCUMENTS

| | | | |
|---|---|---|---|
| 776,512 | 12/1904 | Henry | 24/71.1 UX |
| 1,276,702 | 8/1918 | Anderson | 24/71.1 |
| 1,638,432 | 8/1927 | Connors | 254/231 |
| 2,456,895 | 12/1948 | Sattler | 24/71.1 |
| 2,696,648 | 12/1954 | Sperti | 24/71.1 |
| 2,705,824 | 4/1955 | Lacher | 24/71.1 |
| 2,741,818 | 4/1956 | Bader | 24/71.1 |
| 3,960,359 | 6/1976 | Svahn et al. | 254/67 |
| 4,157,171 | 6/1979 | Hasselas | 254/67 |
| 4,223,869 | 9/1980 | Patterson et al. | 24/68 CD |
| 4,560,147 | 12/1985 | Bowdren | 254/231 |
| 4,567,627 | 2/1986 | Patterson et al. | 24/68 CT |
| 4,612,686 | 9/1986 | Bowers | 24/71.1 |
| 4,624,449 | 11/1986 | Gentry | 254/231 |
| 4,682,426 | 7/1987 | De Marchi | 24/68 CD X |
| 5,159,729 | 11/1992 | Walker | 24/68 CD |

FOREIGN PATENT DOCUMENTS 351655  2/1905  France .................. 24/71.1

*Primary Examiner*—Peter M. Cuomo
*Assistant Examiner*—Robert J. Sandy

[57] ABSTRACT

A tie-down device for securing cargo bindings. The device includes a housing unit with a hollow cavity therein. A threaded screw extending through the bore of the cavity and projecting through an opening in a closed end of the housing unit and secured to a threaded fastener. The invention further includes a threaded nut and capture assembly fixedly attached to the opposing end of the threaded screw that is able to extend and retract through an open end of the housing unit. The threaded screw can be turned to a first position projecting the capture assembly through the open end to either capture or loosen bindings. The threaded screw can be turned to a second position causing the secured bindings to be retracted into the housing unit facilitating their tightening.

6 Claims, 4 Drawing Sheets

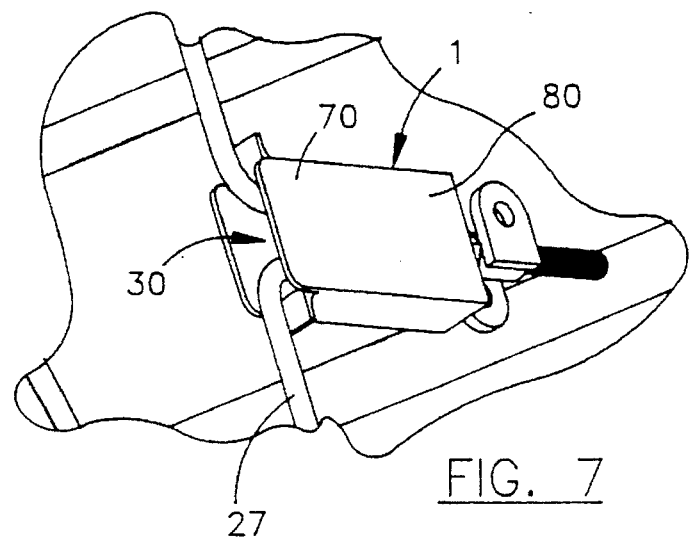
FIG. 7
FIG. 6
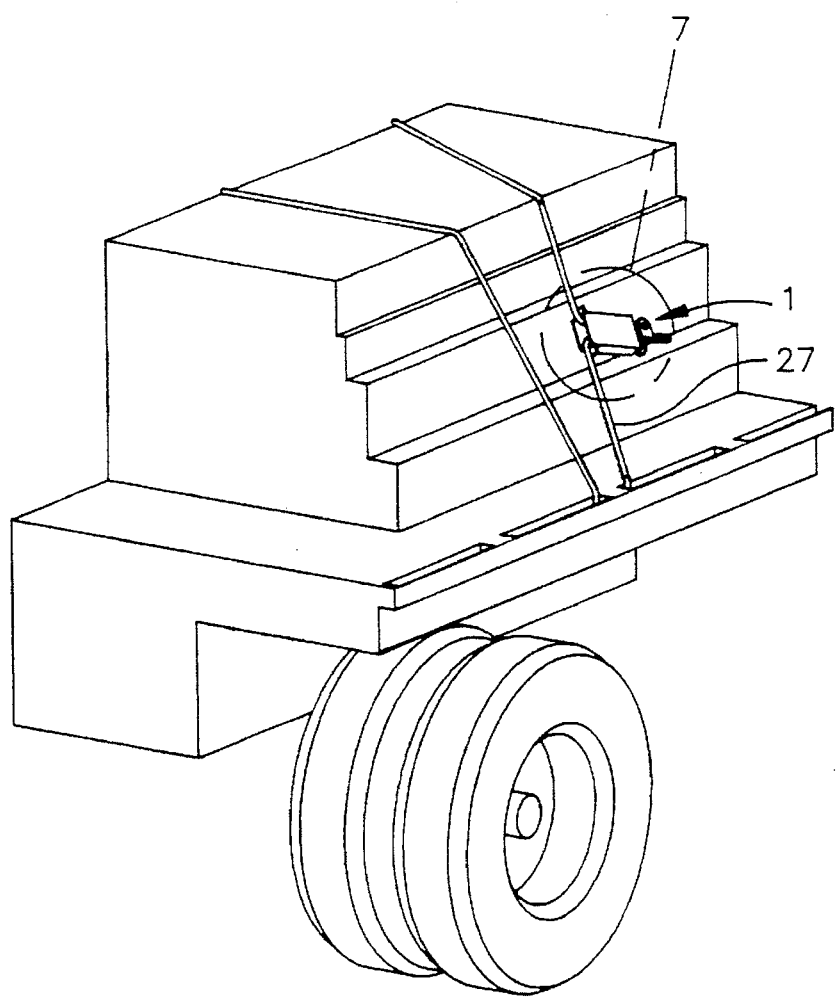

RETRACTABLE BINDER FOR SECURING CARGO LOADS

FIELD OF THE INVENTION

The invention relates generally to a device and method of binding cargo loads, and more particularly to a retractable device that draws lashings into a housing unit to tighten the cargo load while transporting then expanding it to loosen bindings when cargo is unloaded from a vehicle, trailer, or stationary platform.

BACKGROUND OF THE INVENTION

Transporting goods or implements has long necessitated securing loads on vehicles or trailers. Movement of the load during transportion it is a problem because cargo may be damaged or it may create a safety hazard if not properly secured. There is a need for a way that is both reliable and cost effective in performing this function. Furthermore, manually adjusting the tension of the lashings to the precise requirements of the load reduces the chances of breaking the bindings by accidentally over-tightening them.

Prior related tie-down art has generally used one or more tum-buckles, the clevis, or a fixed eye used in conjunction with hooks to accomplish the task of securing loads. This generally involves stretching cordage or cable between a fixed anchor and a means of tightening it. To this end a variety of simple and more sophisticated devices exist that employ this principal.

More complex tie-down devices have included combinations of these together with mechanical tensioning components, such as that disclosed in U.S. Pat. No. 4,567, 627 issued to Patterson. The mechanical component permits better adjustment of tension, however, it tends to be somewhat more complicated, bulky, and can be comparatively expensive.

Load binding mechanisms that permit incremental adjustment of load tension have the advantage of customizing the tension to the load. This type of manually adjusted device is disclosed in U.S. Pat. No. 5,159,729 issued to Walker that combines hooks with a coiled strap and tum-buckle. While it permits adjusting the tension made to fit the load, use may be somewhat cumbersome and restricted.

Moreover, the exposure of bindings to the user is a problem common in background art. If the binding device can suddenly pop open, this increases the threat of injury. Binding devices exist that gradually tighten a load. Some of these use a rachet handle mechanism that can be unsafe for the user upon release. The individual is exposed to the cordage or cable if it breaks as tension is increased and the lashings are tightened to secure a cargo load. The binding may break causing injury to the individual user. The chance of injury may be reduced or eliminated if a device is able to secure the binding at critical points that permit both the adjustment of binder tension in a gradual manner and retraction of the cordage into a protective encasement or shield.

SUMMARY OF THE INVENTION

One object of the invention is to create a load-binding device that is simple and innexpensive to manufacture. This lowers the cost of production and subsequent resale price. The instant device is both simple in design and cost effective to produce.

Another object is to make a device that is simple to use. This includes an apparatus that has few moveable parts and is durable. The invention must not be cumbersome to use and must be adjustable so that it may be adapted to a load quickly by the user.

A further object is to make a device that will not pop open like some current conventional tightening devices are known to do and will not spring back during the tightening procedure causing injuries.

Another object is to provide a binding apparatus that provides an infinite number of tension settings for the binding straps as opposed to the conventional tightening devices which are generally indexed to the teeth on their indexing wheel.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentality's and combinations particularly pointed out in the appended claims.

According to the present invention, the foregoing and other objects and advantages are attained by spacing a means of capturing and securing cargo bindings that extends through the second open end from a means that is able to receive a threaded body connected to each end. This body is preferably a screw. The means on each end are in an operative relationship with each other so that when the screw is rotated a first direction the device extends through the open end into a first position and the lashings may be captured and secured thereby increasing tension; when the screw is rotated in a second direction the device retracts into the encasement cavity tightening the bindings.

Preferably the housing unit includes two flanges and two shoulder guides on the open end. The shoulder guides keep the lashings in alignment with the encasement cavity as they are drawn inside. The flanges form surfaces over which the bindings pass as they are tightened or loosened.

In one preferred embodiment the first open end means of capturing the cargo bindings includes a treaded nut interposed between two guide arms each having respective opposing holes in the arm. The nut immovably holds one end of the threaded screw. The arms are spaced so that they fit flush with the sides of the encasement cavity when drawn in thereby preventing rotation. Lashings are held in place by the capture pin that is placed through the capture pin openings.

In accordance with another aspect of the invention it is preferred that the second closed end means of rotating the threaded screw includes a threaded fastener and collar through which the screw may pass causing extension or retraction of the opposing end. At least one ear is welded to the collar and includes an opening through which a leveraging bar may pass and be used to increase the force applied to rotating the threaded screw.

In accordance with another aspect of the invention, a process is disclosed for securing cargo. The process includes providing a capture means and a rotating means on respective ends of a threaded screw. The cargo lashings are secured in the capture means and retracted into the encasement cavity by rotating the threaded screw in a given direction. Lashings are loosened by rotating the threaded screw in the opposite direction.

BRIEF DESCRIPTION OF THE DRAWINGS

FIG. 6 is a view of the invention as it appears while binding a load.

FIG. 7 is an expanded perspective view of a broken away portion of the invention shown in the circled portion of FIG. 6 labeled "7".

DETAILED DESCRIPTION OF THE INVENTION

Regarding the drawings, FIGS. 1–7 are now discussed with respect to the binding device. The device as applied to binding a load on a trailer vehicle is shown in FIGS. 6 and 7. The invention is designed as a tie-down apparatus for various cargo loads.

Figure 1:
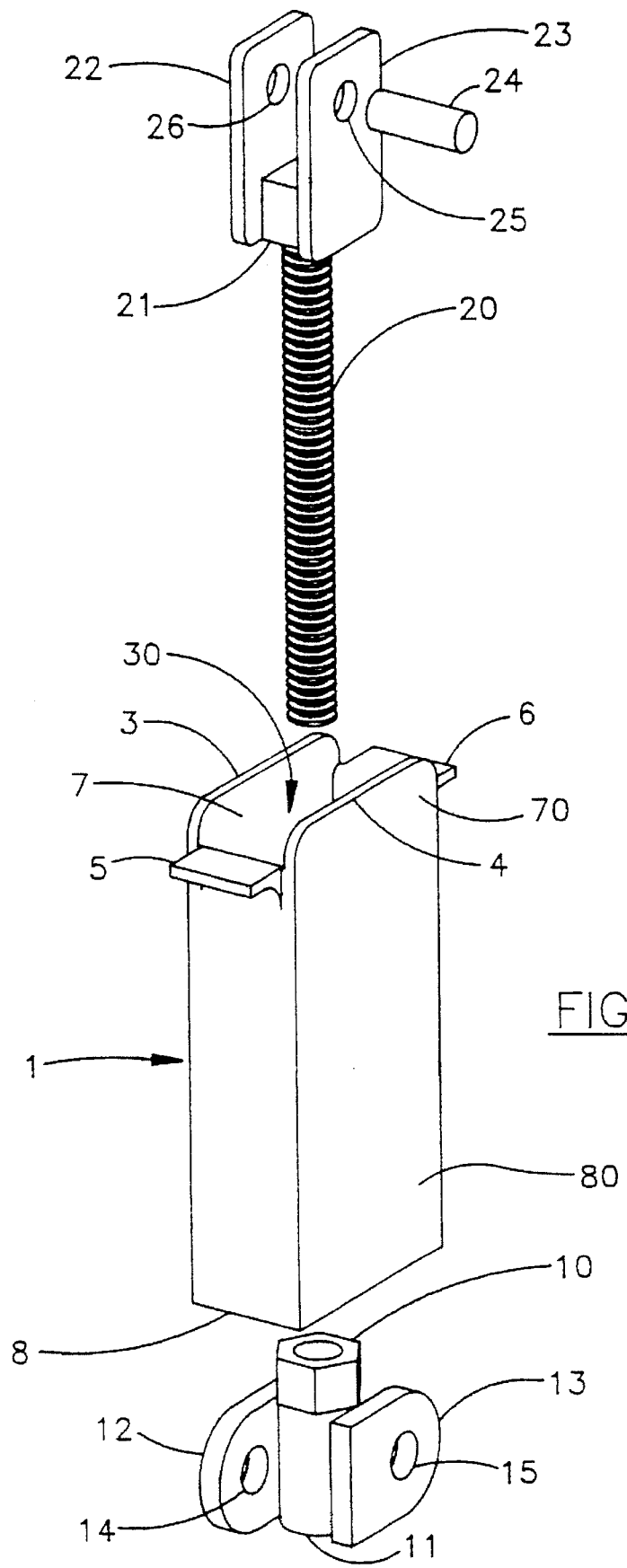
FIG. 1 is an exploded view of the invention showing the threaded binding mechanism and the leveraging collar respectively projecting from the open and closed ends of the housing unit.

FIG. 1 shows the device in an exploded full view. The device includes a housing unit 1. This unit should be made of some form of durable, hardened plastic or, preferably, of steel. The unit must be large enough to contain other components necessary to bind cargo, but it must be small enough for a user to manually manipulate to a position that secures cargo. The preferred shape of the housing unit is rectangular with dimensions of four inches long by two inches wide by 3/16ths inch thick. This is a size that is compact and easy to handle. Other shapes and dimensions of the housing unit will work, however.

The housing unit is closed on a first end 80 and open on a second end 70. The four sides of the housing unit together define an encasement cavity 30. The encasement cavity 30 provides a space where cargo lashings may be drawn in from the open end 70 to tie down loads by turning a rotating portion 10–14 to move a threaded screw 20 within the encasement cavity 30 to thereby extend and retract a binding capture portion 21–26 with respect to the cavity 30. These are illustrated in greater detail in various modes in FIGS. 2–5 and will now be explained in greater detail.

The second open end 70 is defines a track that guides and receives the lashing through the open end. The open end shown in FIG. 2 with the capture assembly in an extended position for securing bindings and in FIG. 4 as it appears when retracted inside the encasement cavity 30 without the bindings.

Figure 2:
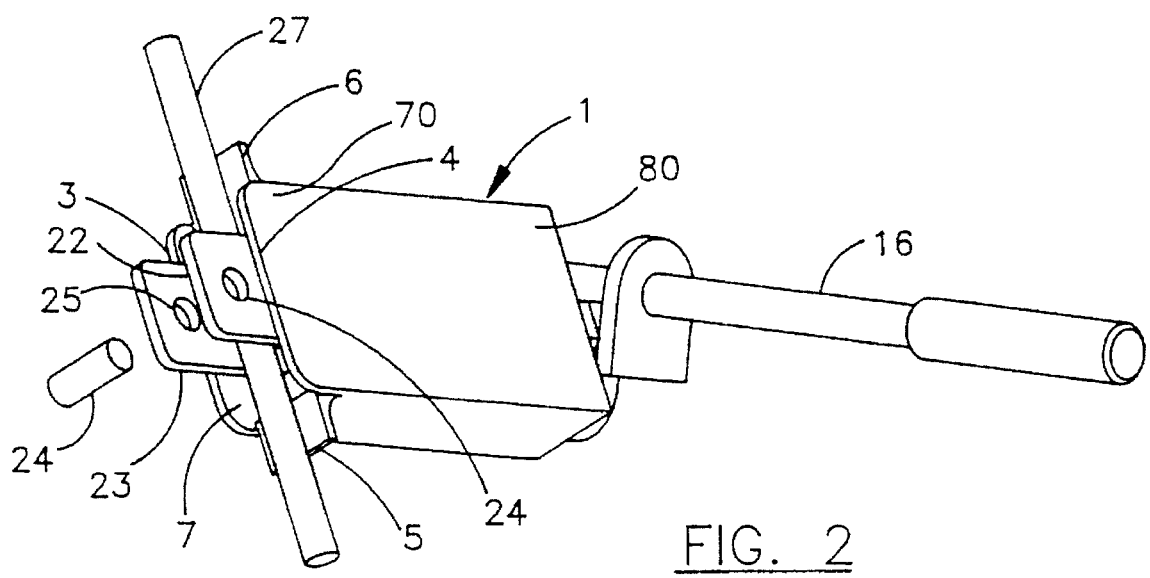
FIG. 2 is a cross-sectional view of the of the right side of the invention showing the threaded screw and the open end in the extended position.
Figure 3:
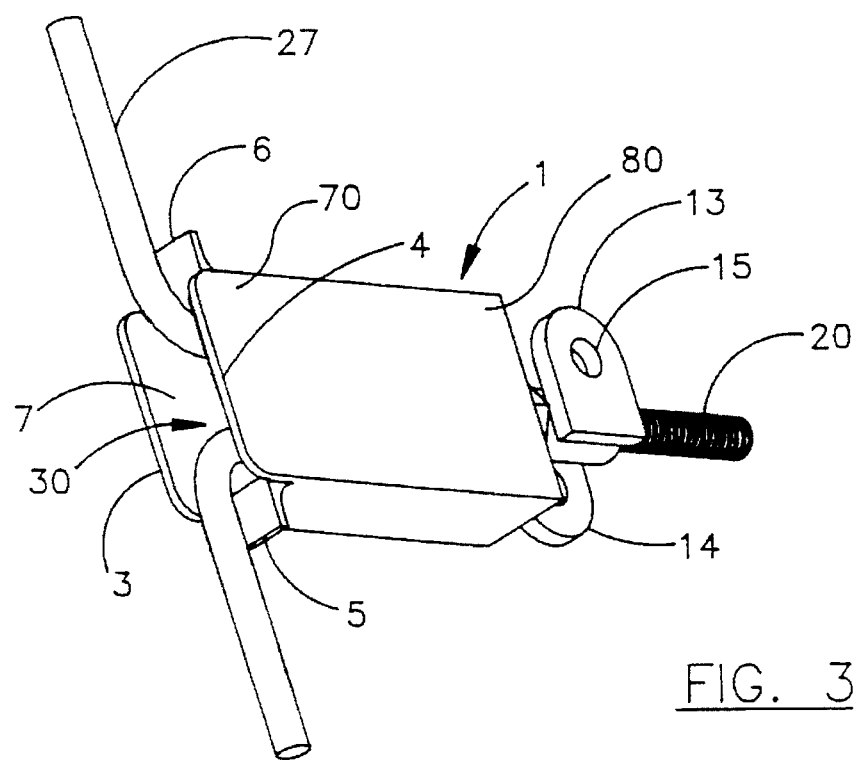
FIG. 3 is a cross-sectional view from the right side with the threaded screw retracted from the open end securing the bindings in a position to tighten down the cargo load.
Figure 4:
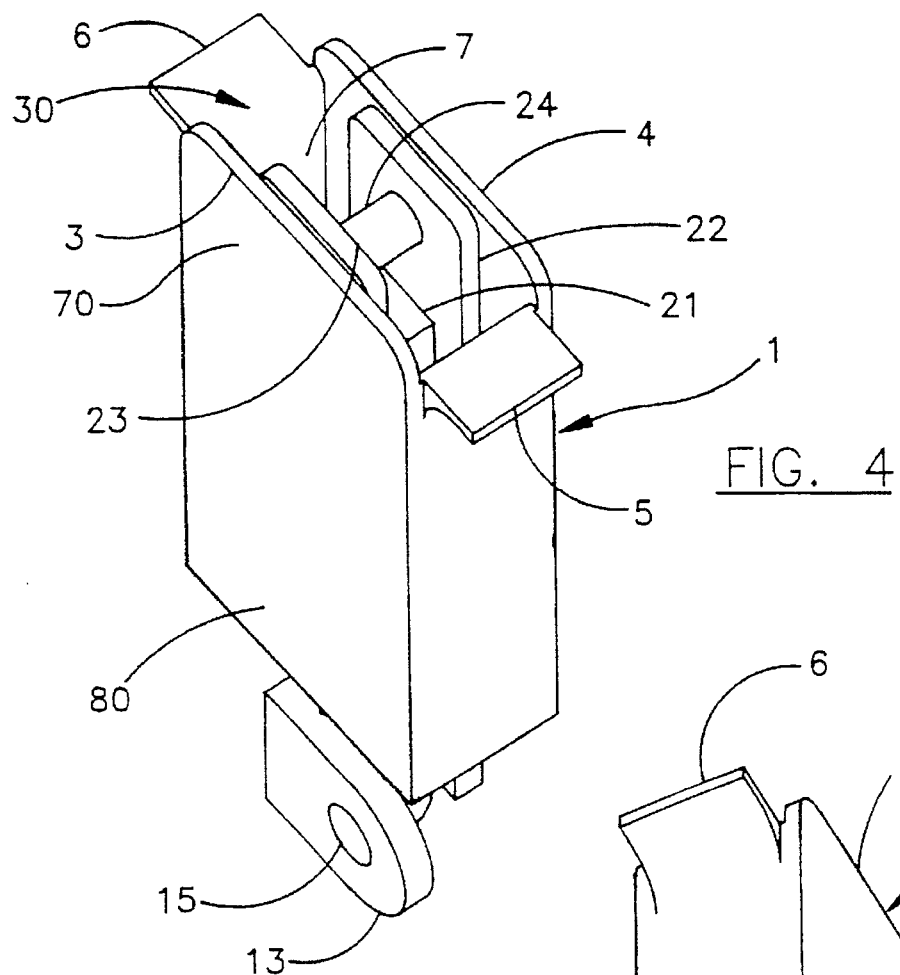
FIG. 4 is a bottom view of the open end of the invention with the threaded screw in the retracted position.

The track delimits the range in which the bindings move by forming two opposing flanges 5 and 6. The flanges form a lip on which the lashing move as they enter the cavity 30. The flanges must be smooth so that no sharp edges can sever the bindings. Two shoulder guides 3 and 4 run perpendicular to the flanges along opposing sides of the housing unit. The guides extend a short distance above the flanges forming a ridge against which the lashing 27 rests when they move in and out of the housing unit. FIGS. 2 and 3 show the lashing 27 as it is secured and then drawn into the encasement cavity.

A threaded screw 20 passes longitudinally through the bore of the encasement cavity 30. The screw engages on one end a first rotating means at the first closed end 80. This means is depicted in 10–14 and in FIG. 5. A hole is drilled through the closed end wide enough for the threaded screw 20 to pass through. The screw is then attached outside the closed end.

Figure 5:
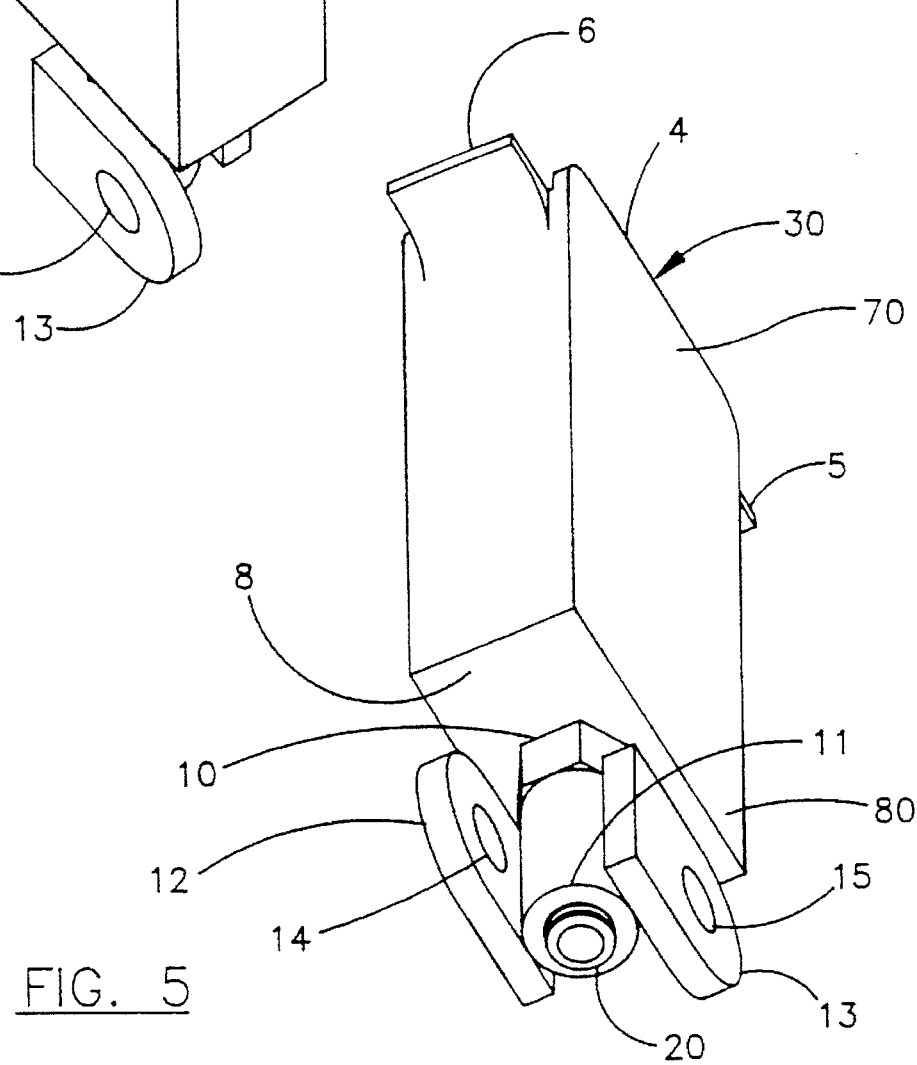
FIG. 5 is a top view of the closed end of the invention showing the threaded screw as it passes through the leveraging collar.

In the preferred embodiment the first means of attachment includes a threaded fastener 10 welded to a threaded leverage collar 11. The fastener and collar are sized to receive the threaded screw 20 as is shown in FIG. 5. The collar 11 includes at least one and, preferably, two ears 12 and 13 that have holes 14 and 15 sized to receive a leveraging tool 16 illustrated in FIG. 2. The tool is inserted in the opening of one ear and pressure applied to rotate the fastener 10 and collar 11. The advantage of using the leveraging tool 16 is that it can be used to rotate the fastener 10 and collar 11 to effectuate tightening of cargo lashings to a greater degree than simply turning the fastener and collar with the hand. This permits the operator to secure the bindings precisely to the tension desired.

The opposing end of the threaded screw 20 engages a second means of capturing and securing cargo bindings at the second end 70. In the preferred embodiment the screw is immovably locked to a threaded nut 21 that fixedly holds the screw. The threaded nut attaches to an assembly designed to capture and secure the lashing 27.

Preferably, the assembly 20–24 includes two guide arms 22 and 23 that are spaced substantially parallel from one another and attached to opposing sides of the threaded nut 21. The guide arms are rectangular in shape and include respective pin openings 25 and 26 sized to receive a capture pin 24. The bindings can be placed between the guide arms 22 and 23 and the capture pin 24 inserted to secure them. This is illustrated in FIG. 2.

The first rotating means 10–15 can be rotated on the threaded screw 20 to move the threaded screw and the capture assembly through the encasement cavity 30 and into a first extended position where at least a portion of the capture assembly projects out of the second end 70 of the housing body. When the first rotating means is used to actuate the threaded screw 20 into a second retracted position, the capture assembly (e.g., the threaded nut 21 and the guide arms 22, 23) are pulled back into the housing encasement cavity 30. The first rotating means is actuated by applying leverage to the threaded collar 11 and threaded fastener 10 by the leveraging bar 16.

The guide arms 22 and 23 are spaced so that the diameter measured from their outside edges is slightly shorter than the diameter between the shoulder guides 3 and 4. This allows the capture assembly to snugly fit inside the encasement cavity 30.

This description contains forms of the invention that are preferred embodiments. Those skilled in the art will appreciate that various changes may be made to the invention without departing from the scope of the appended claims.

I claim:

1. A load binding system comprising:

a housing body having four sides together defining an encasement cavity, the housing body having a first closed end spaced from a second open end, a threaded screw extending longitudinally through a bore in the first closed end and into the encasement cavity of the housing body, a first rotating means threadably engaging a portion of the threaded screw located outside of the encasement cavity adjacent to the bore in the first closed end, and a second capture means for capturing cargo lashings, the second capture means being fixed to a portion of the screw opposite the first rotating means, the second capture means having a first extended position substantially outside of the encasement cavity for permitting the capture of cargo lashings and having a second retracted position substantially inside the encasement cavity, wherein rotation of the first rotating means causes movement of the second capture means from the first extended position to the second retracted position such that cargo lashings captured by the second capture means may be pulled into the encasement cavity to facilitate a tightened condition of a captured lashing looped about cargo, and wherein said first rotating means includes a threaded fastener that engages the portion of said threaded screw projecting through the bore in said first closed end, the fastener being fixedly attached to a threaded leveraging collar, at least one ear being attached to the collar with each ear having an opening sized to receive a leveraging bar used to the threaded fastener of said first rotating means to move said second capture means alternately between said first and said second positions.

2. A load binding system according to claim 1 wherein said second capture means includes a threaded nut fixedly secured to the end of said threaded screw, and two guide arms each spaced from and substantially parallel to one another and fixedly attached to respective opposing sides of the threaded nut, each guide arm having an opening therein aligned with the opening in the other guide arm so that a capture pin may be inserted through the openings such that lashings may be secured to the screw.

3. A load binding system according to claim 2 wherein said housing body is preferably made of hardened steel and is rectangular in with dimensions two inches wide by four inches long by 3/16 inch in depth.

4. A load binding system according to claim 1 wherein said housing body on said second open end includes two flange portions spaced from one another on opposing sides and a shoulder guide to channel the movement of said lashings used for binding cargo over the flanges.

5. A load binding system comprising:

a housing body having four sides together defining an encasement cavity; said housing body having a first closed end including a bore therein and a second open end shaped to receive cargo bindings, said second open end having two flanges spaced from one another on opposing sides of the housing body and two shoulder guides substantially parallel to each other, each shoulder guide forming a respective rib perpendicularly intersecting the respective outside edges of the flanges so that movement of lashings used for binding cargo is channeled in a track over the flanges;

a threaded screw extending longitudinally through the bore and into said encasement cavity, a threaded nut fixed on one end of the screw and a threaded fastener threadably engaged on an opposite portion of the screw;

two guide arms spaced from and substantially parallel to each other and immovably attached to respective sides of the threaded nut; each arm including an opening therein aligned with the opening in the other guide arm so that a capture pin may be inserted through the openings to thereby permit securing of lashings to said screw; and a leveraging collar fixedly attached to the threaded fastener; at least one ear attached to the collar including an opening sized to receive a leveraging bar for rotating the leveraging collar and the threaded fastener to thereby move the threaded screw from a first extended position to a second retracted position to thereby tighten lashings by retracting the opposing end of the threaded screw.

6. A method of securing cargo comprising the steps of:

a) providing a load binding system comprising a housing body forming an internal encasement cavity, a threaded screw extending into said encasement cavity, a first rotating means threadably engaging said threaded screw for moving said threaded screw relative to said encasement cavity, and a second capture means fixed to said threaded screw for removably securing cargo lashings to said threaded screw;

b) rotating said first rotating means so that said second capture means moves into a first expanded position substantially outside of said encasement cavity;

c) securing a cargo lashing to said second capture means by placing a cargo lashing between two guide arms of said second capture means that are oriented in a spaced and substantially parallel relationship to each other and are fixedly attached to respective opposing sides of a threaded nut fixed to the end of said threaded screw, d) inserting a capture pin through openings in said guide arms to thereby trap said lashing between said guide arms, and e) rotating said first rotating means such that said second capture means moves into said encasement cavity to thereby shorten the effective length of said lashings outside said encasement cavity.

* * * * *